United States Patent
Liu et al.

(10) Patent No.: US 11,272,207 B2
(45) Date of Patent: Mar. 8, 2022

(54) SELECTION AND SIGNALING OF MOTION VECTOR (MV) PRECISIONS

(71) Applicant: Futurewei Technologies, Inc., Plano, TX (US)

(72) Inventors: Shan Liu, San Jose, CA (US); Wei Wang, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/982,865

(22) Filed: May 17, 2018

(65) Prior Publication Data

US 2018/0359485 A1 Dec. 13, 2018

Related U.S. Application Data

(60) Provisional application No. 62/518,402, filed on Jun. 12, 2017.

(51) Int. Cl.
| | | |
|---|---|---|
| H04N 19/56 | (2014.01) | |
| H04N 19/176 | (2014.01) | |
| H04N 19/52 | (2014.01) | |
| H04N 19/523 | (2014.01) | |

(52) U.S. Cl.
CPC ........... *H04N 19/56* (2014.11); *H04N 19/176* (2014.11); *H04N 19/52* (2014.11); *H04N 19/523* (2014.11)

(58) Field of Classification Search
None
See application file for complete search history.

(56) References Cited

U.S. PATENT DOCUMENTS

| | | |
|---|---|---|
| 8,526,495 B2 | 9/2013 | Liu et al. |
| 9,049,452 B2 | 6/2015 | Liu et al. |
| 9,363,511 B2 | 6/2016 | Zhang et al. |
| 9,510,012 B2 | 11/2016 | Liu et al. |
| 9,769,472 B2 | 9/2017 | Liu et al. |
| 9,788,019 B2 | 10/2017 | Liu et al. |
| 9,813,726 B2 | 11/2017 | Liu et al. |

(Continued)

FOREIGN PATENT DOCUMENTS

| | | |
|---|---|---|
| CN | 1456999 A | 11/2003 |
| CN | 102342108 A | 2/2012 |

(Continued)

OTHER PUBLICATIONS

"High Efficiency Video Coding," Series H: Audiovisual and Multimedia Systems Infrastructure of Audiovisual Services—Coding of Moving Video, ITU-T, H.265, Dec. 2016, 664 pages.

(Continued)

*Primary Examiner* — Frederick D Bailey
(74) *Attorney, Agent, or Firm* — Conley Rose, P.C.

(57) ABSTRACT

An apparatus comprises: a memory; and a processor coupled to the memory and configured to: obtain a current block of a video frame, obtain candidate MVs corresponding to neighboring blocks of the video frame, the neighboring blocks neighbor the current block, obtain precisions of the candidate MVs, perform first rounding of the precisions based on a rounding scheme, perform second rounding of the candidate MVs based on the first rounding, perform pruning of the candidate MVs, and generate a candidate list based on the second rounding and the pruning.

24 Claims, 4 Drawing Sheets

(56) References Cited

U.S. PATENT DOCUMENTS

| | | | |
|---|---|---|---|
| 10,924,746 B2 | 2/2021 | Chuang et al. | |
| 2003/0194010 A1 | 10/2003 | Mukerjee et al. | |
| 2004/0184537 A1 | 9/2004 | Geiger et al. | |
| 2004/0218674 A1* | 11/2004 | Kondo | H04N 19/52 375/240.16 |
| 2005/0053141 A1 | 3/2005 | Holcomb et al. | |
| 2008/0165856 A1 | 7/2008 | Suzuki | |
| 2009/0097560 A1* | 4/2009 | Robertson | H04N 19/176 375/240.16 |
| 2012/0057632 A1 | 3/2012 | Sato | |
| 2012/0294370 A1 | 11/2012 | Chiu et al. | |
| 2012/0300850 A1* | 11/2012 | Yie | H04N 19/513 375/240.16 |
| 2013/0177082 A1* | 7/2013 | Sugio | H04N 19/593 375/240.16 |
| 2013/0272410 A1 | 10/2013 | Seregin et al. | |
| 2013/0315313 A1 | 11/2013 | Yang et al. | |
| 2014/0086323 A1 | 3/2014 | Chuang et al. | |
| 2014/0362921 A1* | 12/2014 | Puri | H04N 19/176 375/240.16 |
| 2015/0172719 A1 | 6/2015 | Guo et al. | |
| 2015/0195525 A1* | 7/2015 | Sullivan | H04N 19/136 375/240.02 |
| 2015/0195562 A1* | 7/2015 | Li | H04N 19/56 375/240.02 |
| 2015/0249838 A1* | 9/2015 | Chang | H04N 19/597 375/240.16 |
| 2015/0365692 A1 | 12/2015 | Liu et al. | |
| 2016/0014408 A1* | 1/2016 | Shimada | H04N 19/543 375/240.16 |
| 2016/0100189 A1 | 4/2016 | Pang et al. | |
| 2016/0142706 A1 | 5/2016 | Chuang et al. | |
| 2016/0337649 A1 | 11/2016 | Chuang et al. | |
| 2016/0337661 A1* | 11/2016 | Pang | H04N 19/105 |
| 2017/0099495 A1 | 4/2017 | Rapaka et al. | |
| 2017/0238005 A1* | 8/2017 | Chien | H04N 19/513 375/240.16 |
| 2017/0272745 A1 | 9/2017 | Liu et al. | |
| 2017/0310961 A1* | 10/2017 | Liu | H04N 19/107 |
| 2017/0332099 A1 | 11/2017 | Lee et al. | |
| 2017/0353730 A1 | 12/2017 | Liu et al. | |
| 2017/0374369 A1 | 12/2017 | Chuang et al. | |
| 2018/0041768 A1 | 2/2018 | Koo et al. | |
| 2018/0098087 A1* | 4/2018 | Li | H04N 19/176 |
| 2018/0098089 A1* | 4/2018 | Chen | H04N 19/157 |
| 2018/0131960 A1 | 5/2018 | Wang et al. | |
| 2019/0141334 A1* | 5/2019 | Lim | H04N 19/52 |
| 2020/0029091 A1* | 1/2020 | Chien | H04N 19/139 |
| 2020/0036967 A1 | 1/2020 | Tsai et al. | |
| 2020/0084469 A1 | 3/2020 | Lee et al. | |

FOREIGN PATENT DOCUMENTS

| | | |
|---|---|---|
| CN | 102611887 A | 7/2012 |
| CN | 104335586 A | 2/2015 |
| CN | 105874789 A | 8/2016 |
| CN | 106165419 A | 11/2016 |
| CN | 106331703 A | 1/2017 |
| CN | 106797476 A | 5/2017 |
| JP | 2017508346 A | 3/2017 |
| JP | 2017533669 A | 11/2017 |
| KR | 20150008394 A | 1/2015 |
| WO | 03063503 A1 | 7/2003 |
| WO | 2013053309 A1 | 4/2013 |

OTHER PUBLICATIONS

Liu, et al., "Joint Temporal-Spatial Bit Allocation for Video Coding With Dependency," IEEE Transactions on Circuits and Systems for Video Technology, vol. 15, No. 1, Jan. 2005, pp. 15-26.

Liu, et al., "Global/Local Motion-Compensated Frame Interpolation for Low Bitrate Video," The Journal of Visual Communication and Image Representation, vol. 14, Jun. 2003, pp. 61-79.

Liu, et al., "Joint Temporal-Spatial Rate Control with Approximating Rate-Distortion Models," Proceedings of SPIE Visual Communications and Image Processing 2002, vol. 4671, pp. 746-755.

Liu, et al., "Complexity Reduction of Joint Temporal-Spatial Bit Allocation Using R-D Models for Video Streaming," IEEE International Conference on Image Processing, Rochester, New York, Sep. 22-25, 2002, pp. 729-732.

Liu, et al., "Efficient MPEG-2 to MPEG-4 Video Transcoding," Conference on Image and Video Communications and Processing, IS&T/SPIE's 15th Annual Symposium for Electronic Imaging 2003: Science & Technology, Santa Clara, CA, Jan. 20-24, 2003, pp. 186-195.

Liu, et al., "Joint spatial-temporal rate control for video transcoding," IEEE International Conference on Multimedia and Expo (ICME), Baltimore, Maryland, Jul. 6-9, 2003, pp. 225-228.

Zhang, et al., "Intra mode coding in HEVC standard", Visual Communications and Image Processing (VCIP), IEEE, Jan. 2012, 6 pages.

Liu, et al., "Rectangular partitioning for Intra prediction in HEVC", Visual Communications and Image Processing (VCIP), IEEE, Jan. 2012, 4 pages.

Zhang, et al., "Non-ce6: Intra mode coding with fixed length binarization", ITU-T/ISO/IEC, JCTVC-H0435, 2012, 5 pages.

Lai, et al, "SCE3. 4 generalized combined prediction", ITU-T/ISO/IEC, JCTVC-M0221, 2013, 10 pages.

Kim, et al, "Non-TE5: Assigning intra prediction mode to inter layer intra predicted blocks in enhance layer", ITU-T/ISO/IEC, JCTVC-L0239, 2013, 5 pages.

Lai, et al, "Non-SCE3.4: Simplified Generalized Combined Prediction", ITU-T/ISO/IEC, JCTVC-M0222, 2013, 9 pages.

Seregin, et al, "Uni-prediction for combined inter mode", ITU-T/ISO/IEC, JCTVC-M0445, 2013, 11 pages.

Xu, et al, "On unification of intra block copy and inter-picture motion compensation", ISO/IEC JTC1/SC29/WG11 JCTVC-Q0132, 2014, 14 pages.

Xu, et al, "Non-CE2: Intra BC merge mode with default candidates", ISO/IEC JTC1/SC29/WG11 JCTVC-S0123, 2014, 7 pages.

Xu, et al, "CE2: Test 3.2—Intra BC merge mode with default candidates", ISO/IEC JTC1/SC29/WG11 JCTVC-T0073, 2015, 6 pages.

Liu, S., et al., "Hybrid global-local motion compensated frame interpolation for low bit rate video coding," J. Vis. Commun. Image R., vol. 14, 2003, pp. 61-79.

Liu, S., et al., "Non-linear Motion-compensated Interpolation for Low Bit Rate Video," Applications of Digital Image Processing XXIII, vol. 4115, 2000, 11 pages.

Liu, S., et al., "MCI-embedded Motion Compensated Prediction for Quality Enhancement of Frame Interpolation," Multimedia Systems and Applications III, vol. 4209, Mar. 2001, 11 pages.

Lou, J., et al., "Complexity and memory efficient GOP structures supporting VCR functionalities in H. 264/AVC," IEEE International Symposium on Circuits and Systems, 2008, pp. 636-639.

Lou, J., et al., "Trick-Play Optimization for H.264 Video Decoding," Journal of Information Hiding and Multimedia Signal Processing, TR2010-076, Sep. 2010, 15 pages.

Liu, S., et al., "Joint Temporal-Spatial Rate Control for Adaptive Video Transcoding," IEEE International Conference on Multimedia and Expo, Jul. 6-9, 2003, 4 pages.

Lai, P., et al., "Combined Temporal and Inter-layer Prediction for Scalable Video Coding using HEVC," Picture Coding Symposium, 2013, pp. 117-120.

Liu, S., et al., "Remove Partition Size N×N," JCTVC-D432, Jan. 20-28, 2011, 7 pages.

Liu, S., et al., "Evaluations and suggestions for TU representation," JCTVC-E083, WG11 No. m19597, Mar. 16-23, 2011, 8 pages.

Zhang, X., et al., "Method for deriving Chroma QP from Luma QP," JCTVC-F277, Jul. 14-22, 2011, 6 pages.

Liu, S., et al., "Rectangular (2N×N and N×2N) Intra Prediction," JCTVC-G135, WG11 No. 21687, Nov. 21-30, 2011, 6 pages.

Zhang, X., et al., "Method and syntax for quantization matrices representation," JCTVC-G152, Nov. 21-30, 2011, 8 pages.

Liu, S., et al., "Support of ChromaQPOffset in HEVC," JCTVC-G509r1, Nov. 21-30, 2011, 8 pages.

(56) References Cited

OTHER PUBLICATIONS

Oudin, S., et al., "Harmonization of the prediction and partitioning mode binarization of P and B slices," JCTVC-G1042, Nov. 21-30, 2011, 4 pages.
Cao, X., et al., "AHG16 Unification of SDIP and NSQT," JCTVC-H0347, Feb. 1-10, 2012, 9 pages.
Lai, P., et al., "Non-SCE3.4: Simplified Generalized Combined Prediction," JCTVC-M0222, Apr. 2013, 10 pages.
Foreign Communication From a Counterpart Application, PCT Application No. PCT/CN2018/090181, English Translation of International Search Report dated Aug. 29, 2018, 8 pages.
Foreign Communication From a Counterpart Application, PCT Application No. PCT/CN2018/090181, English Translation of Written Opinion dated Aug. 29, 2018, 5 pages.
Chiu, Y-J., et al., "CE1: Report of self derivation of motion estimation in TMuC 0. 9", Motion Picture Expert Group or ISO/IEC JTC1/SC29/WG11, JCTVC-D167_r1, No. m18919, 4th Meeting: Daegu, KR, Jan. 20-28, 2011, XP030047488, 14 pages.
Chen, J., et al., "Algorithm Description of Joint Exploration Test Model 6 (JEM 6)," Joint Video Exploration Team (JVET), May 31, 2017, JVET-F1001-v2, (version 2), 4 pages.

\* cited by examiner

SELECTION AND SIGNALING OF MOTION VECTOR (MV) PRECISIONS

CROSS-REFERENCE TO RELATED APPLICATIONS

This application claims priority to U.S. provisional patent application No. 62/518,402 filed on Jun. 12, 2017 by Futurewei Technologies, Inc. and titled "Motion Vector Prediction and Merge Candidate Selection," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Videos use a relatively large amount of data, so communication of videos uses a relatively large amount of bandwidth. However, many networks operate at or near their bandwidth capacities. In addition, customers demand high video qualities, which require using even more data. There is therefore a desire to both reduce the amount of data videos use and improve the video qualities. One solution is to compress videos during an encoding process and decompress the videos during a decoding process. Improving compression and decompression techniques is a focus of research and development.

SUMMARY

According to one aspect of the present disclosure, there is provided an apparatus comprising: a memory; and a processor coupled to the memory and configured to: obtain a current block of a video frame, obtain candidate MVs corresponding to neighboring blocks of the video frame, the neighboring blocks neighbor the current block, obtain precisions of the candidate MVs, perform first rounding of the precisions based on a rounding scheme, perform second rounding of the candidate MVs based on the first rounding, perform pruning of the candidate MVs, and generate a candidate list based on the second rounding and the pruning.

Optionally, in any of the preceding aspects, another implementation of the aspect provides that the neighboring blocks comprise a first neighboring block and a second neighboring block, and wherein the precisions comprise a first precision of the first neighboring block and a second precision of the second neighboring block.

Optionally, in any of the preceding aspects, another implementation of the aspect provides that the rounding scheme comprises: rounding the first precision to a target precision of the current block; and rounding the second precision to the target precision.

Optionally, in any of the preceding aspects, another implementation of the aspect provides that the rounding scheme comprises: determining a lowest precision from among any combination of the first precision, the second precision, and a target precision of the current block; and rounding at least one of the first precision, the second precision, or the target precision to the lowest precision.

Optionally, in any of the preceding aspects, another implementation of the aspect provides that the rounding scheme comprises: determining a median precision from among any combination of the first precision, the second precision, and a target precision of the current block; and rounding at least one of the first precision, the second precision, or the target precision to the median precision.

Optionally, in any of the preceding aspects, another implementation of the aspect provides that the rounding scheme comprises: determining a highest precision from among any combination of the first precision, the second precision, and a target precision of the current block; and rounding at least one of the first precision, the second precision, or the target precision to the highest precision.

Optionally, in any of the preceding aspects, another implementation of the aspect provides that the rounding scheme comprises: determining a default precision; and rounding at least one of the first precision, the second precision, or a target precision of the current block to the default precision.

Optionally, in any of the preceding aspects, another implementation of the aspect provides that the pruning comprises discarding identical candidate MVs or sub-identical candidate MVs.

Optionally, in any of the preceding aspects, another implementation of the aspect provides that the pruning further comprises adding zero MVs to fill the candidate list.

Optionally, in any of the preceding aspects, another implementation of the aspect provides that the processor is further configured to further perform the first rounding and the second rounding before the pruning.

Optionally, in any of the preceding aspects, another implementation of the aspect provides that the processor is further configured to further perform the first rounding and the second rounding after the pruning.

Optionally, in any of the preceding aspects, another implementation of the aspect provides that the candidate list is an AMVP candidate list.

Optionally, in any of the preceding aspects, another implementation of the aspect provides that the candidate list is a merge candidate list.

Optionally, in any of the preceding aspects, another implementation of the aspect provides that the processor is further configured to: select a final candidate MV from the candidate list; and signal the final candidate MV in an encoded video.

According to another aspect of the present disclosure, there is provided a method comprising: obtaining a current block of a video frame; obtaining candidate MVs corresponding to neighboring blocks of the video frame, the neighboring blocks neighbor the current block; obtaining precisions of the candidate MVs; performing first rounding of the precisions based on a rounding scheme; performing second rounding of the candidate MVs based on the first rounding; performing pruning of the candidate MVs; and generating a candidate list based on the second rounding and the pruning.

Optionally, in any of the preceding aspects, another implementation of the aspect provides that the neighboring blocks comprise a first neighboring block and a second neighboring block, wherein the precisions comprise a first precision of the first neighboring block and a second precision of the second neighboring block, and wherein the rounding scheme comprises: rounding the first precision to a target precision of the current block; and rounding the second precision to the target precision.

Optionally, in any of the preceding aspects, another implementation of the aspect provides that the method further comprises: selecting a final candidate MV from the candidate list; signaling the final candidate MV in an encoded video; and transmitting the encoded video.

According to another aspect of the present disclosure, there is provided an apparatus comprising: a receiver configured to receive an encoded video comprising a header for a portion of the encoded video, the header comprises a precision for all MVs of a coding mode in the portion; a processor coupled to the receiver and configured to decode the encoded video to obtain a decoded video based on the precision; and a display coupled to the processor and configured to display the decoded video.

Optionally, in any of the preceding aspects, another implementation of the aspect provides that the portion is a slice, a region, a CTU, or a tile.

Optionally, in any of the preceding aspects, another implementation of the aspect provides that the precision is one of quarter-pel precision, half-pel precision, integer-pel precision, or four-pel precision.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations and initialisms apply:
AMVP: advanced motion vector prediction
ASIC: application-specific integrated circuit
CPU: central processing unit
CTU: coding tree unit
DSP: digital signal processor
EO: electrical-to-optical
FPGA: field-programmable gate array
ITU: International Telecommunication Union
ITU-T: ITU Telecommunication Standardization Sector
LCD: liquid crystal display
MV: motion vector
OE: optical-to-electrical
PPS: picture parameter set
RAM: random-access memory
RF: radio frequency
ROM: read-only memory
RX: receiver unit
SPS: sequence parameter set
SRAM: static RAM
TCAM: ternary content-addressable memory
TX: transmitter unit.

Figure 1:
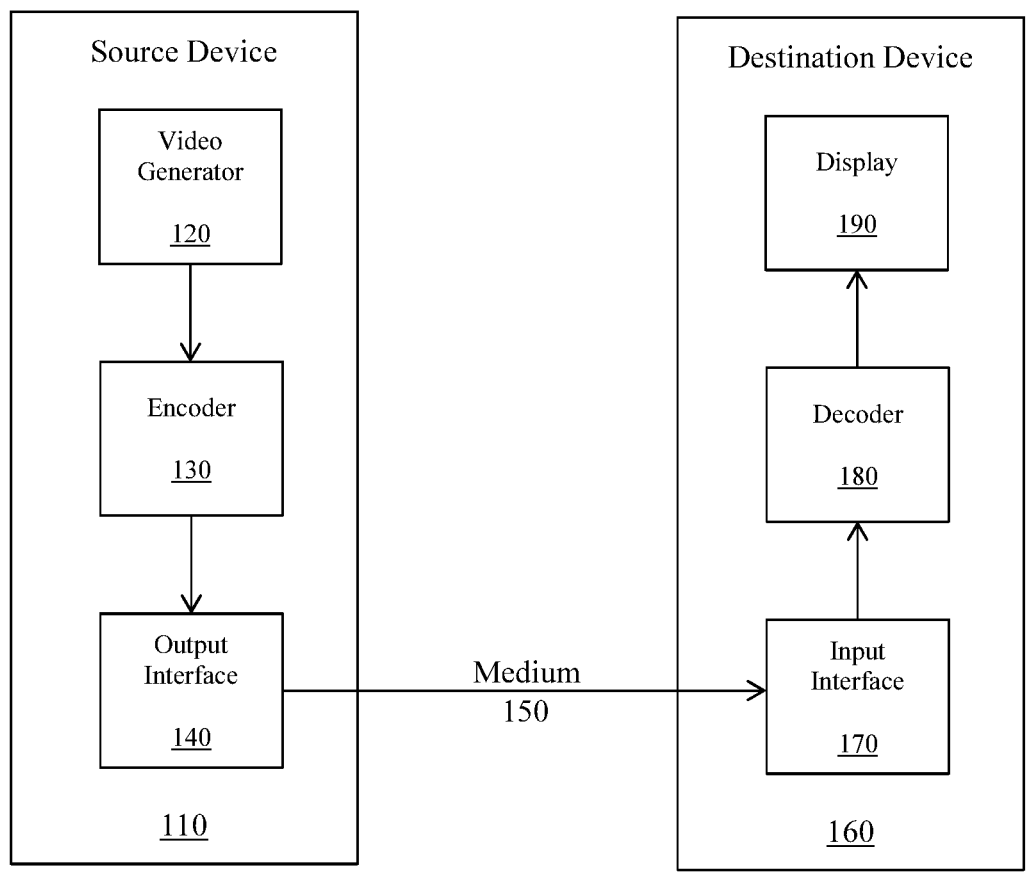
FIG. 1 is a schematic diagram of a coding system.

FIG. 1 is a schematic diagram of a coding system 100. The coding system 100 comprises a source device 110, a medium 150, and a destination device 160. The source device 110 and the destination device 160 are mobile phones, tablet computers, desktop computers, notebook computers, or other suitable devices. The medium 150 is a local network, a radio network, the Internet, or another suitable medium.

The source device 110 comprises a video generator 120, an encoder 130, and an output interface 140. The video generator 120 is a camera or another device suitable for generating video. The encoder 130 may be referred to as a codec. The encoder 130 performs encoding according to a set of rules, for instance as described in "High Efficiency Video Coding," ITU-T H.265, December 2016 ("H.265"), which is incorporated by reference. The output interface 140 is an antenna or another component suitable for transmitting data to the destination device 160. Alternatively, the video generator 120, the encoder 130, and the output interface 140 are in any suitable combination of devices.

The destination device 160 comprises an input interface 170, a decoder 180, and a display 190. The input interface 170 is an antenna or another component suitable for receiving data from the source device 110. The decoder 180 may also be referred to as a codec. The decoder 180 performs decoding according to a set of rules, for instance as described in H.265. The display 190 is an LCD screen or another component suitable for displaying videos. Alternatively, the input interface 170, the decoder 180, and the display 190 are in any suitable combination of devices.

In operation, in the source device 110, the video generator 120 captures a video, the encoder 130 encodes the video to create an encoded video, and the output interface 140 transmits the encoded video over the medium 150 and towards the destination device 160. The source device 110 may locally store the video or the encoded video, or the source device 110 may instruct storage of the video or the encoded video on another device. The encoded video comprises data defined at various levels, including slices and blocks. A slice is a spatially distinct region of a video frame that the encoder 130 encodes separately from any other region in the video frame. A block is a group of pixels arranged in a rectangle, for instance an 8 pixel×8 pixel square. Blocks may also be referred to as units or coding units. Other levels include regions, CTUs, and tiles. In the destination device 160, the input interface 170 receives the encoded video from the source device 110, the decoder 180 decodes the encoded video to obtain a decoded video, and the display 190 displays the decoded video. The decoder 180 may decode the encoded video in a reverse manner compared to how the encoder 130 encodes the video. The destination device 160 locally stores the encoded video or the decoded video, or the destination device 160 instructs storage of the encoded video or the decoded video on another device.

Together, encoding and decoding are referred to as coding. Coding comprises intra coding and inter coding, which may be referred to as intra prediction and inter prediction, respectively. Intra prediction implements spatial prediction to reduce spatial redundancy within a video frame. Inter prediction implements temporal prediction to reduce temporal redundancy between successive video frames.

Figure 2:
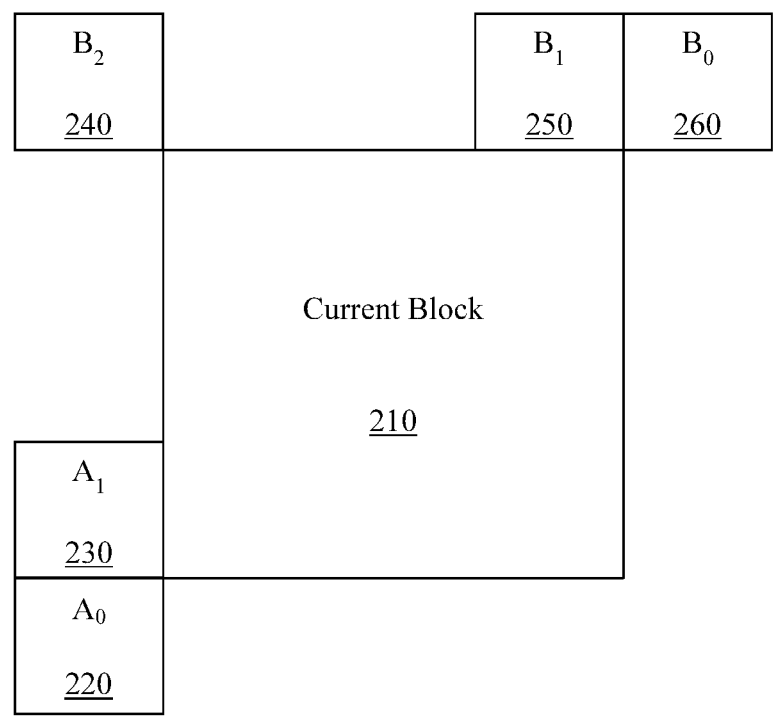
FIG. 2 is a diagram of a portion of a video frame.

FIG. 2 is a diagram of a portion 200 of a video frame. The portion 200 comprises a current block 210 and neighboring blocks $A_0$ 220, $A_1$ 230, $B_2$ 240, $B_1$ 250, and $B_0$ 260. The current block 210 is called a current block because the encoder 130 is currently encoding it. The neighboring blocks 220-260 are called neighboring blocks because they neighbor the current block 210. The neighboring block $A_0$ 220 is in a bottom-left corner position, the neighboring block $A_1$ 230 is in a left-bottom side position, the neighboring block $B_2$ 240 is in a top-left corner position, the neighboring block $B_1$ 250 is in a top-right side position, and the neighboring block $B_0$ 260 is in a top-right corner position. In inter prediction, the encoder 130 determines an MV of the current block 210 based on MVs of the neighboring blocks 220-260. The MVs of the neighboring blocks 220-260 are already known when the encoder 130 is encoding the current block 210.

AMVP and merge are two coding modes the encoder 130 may use to determine the MV of the current block 210. In AMVP, the encoder 130 determines an MV candidate list by sequentially scanning the neighboring blocks 220-260 as follows: $A_0$ 220, $A_1$ 230, a scaled version of $A_0$ 220, a scaled version of $A_1$ 230, $B_0$ 260, $B_1$ 250, $B_2$ 240, a scaled version of $B_0$ 260, a scaled version of $B_1$ 250, a scaled version of $B_2$ 240, a temporal bottom right collocated candidate, a temporal central collocated candidate, and a zero MV. From that candidate list, the encoder 130 selects the best candidate and indicates the best candidate in a signal to the destination device 160. In merge, the encoder 130 determines a candidate list of MVs by sequentially scanning the neighboring blocks as follows: $A_1$ 230, $B_1$ 250, $B_0$ 260, $A_0$ 220, $B_2$ 240, temporal bottom right collocated candidate, temporal central collocated candidate, and a zero MV. From that candidate list, the encoder 130 selects the best candidate and indicates the best candidate in a signal to the destination device 160. Though AMVP and merge scan the neighboring blocks 220-260, other coding modes may scan different neighboring blocks that are not shown.

Both AMVP and merge define precisions for MVs. Precisions indicate a distance between pixels that serves as a multiplier to define an MV. In the context of precisions, pixels may be referred to as pels. Thus, precisions include quarter-pel precision, half-pel precision, integer-pel precision, and four-pel precision. Quarter-pel precision defines an MV in terms of a quarter of a distance between pixels so that the MV may be 0.25, 0.5, 0.75, 1.0, 1.25, and so on. The encoder 130 encodes precisions as flags in slice headers. A slice header is a header at the beginning of a slice signal that indicates data applicable to the entire slice. Alternatively, the encoder 130 encodes precisions as flags or other data in block headers.

Both AMVP and merge define rules for determining qualified candidates for their candidate lists. For instance, if two candidate MVs are the same, then the encoder 130 removes one of those candidate MVs. The encoder 130 continues applying those rules until it fills the candidate lists with a maximum number of allowed candidates. Those rules are well defined when the candidate MVs have the same precision. However, it is desirable to provide coding-efficient rules for candidate MVs with different precisions.

Disclosed herein are embodiments for selection and signaling of MV precisions. The embodiments provide for obtaining MVs with different precisions, rounding those precisions in a uniform manner, rounding MVs, and generating candidate lists. The embodiments further provide for signaling precisions at the slice, region, CTU, or tile level. The embodiments apply to AMVP, merge, and other suitable coding modes.

AMVP Candidate List Generation

In a first embodiment of AMVP candidate list generation, the encoder 130 considers three precisions: a first precision of a first neighboring block 220-260, a second precision of a second neighboring block 220-260, and a third precision of the current block 210. For instance, the encoder 130 considers precisions of the neighboring block 220, the neighboring block 230, and the current block 210. The third precision may be referred to as a target precision because it is associated with the current block 210, which is a target of encoding. Using the three precisions, the encoder 130 executes the following pseudo code:

```
i = 0
if(availableFlagLXA) {
    mvpListLX[ i++] = mvLXA
    if(availableFlagLXB && (
        RoundMvPrecisionToTarget(mvLXA)
        RoundMvPrecisionToTarget(mvLXB)
        mvLXA! = mvLXB)))
    mvpListLX[ i++ ] = mvLXB
} else if(availableFlagLXB)
    mvpListLX[i++] = mvLXB
if( i < 2 && availableFlagLXCol)
    mvpListLX[ i++] = mvLXCol
while( i < 2 ) {
    mvpListLX[i][0] = 0
    mvpListLX[i][1] = 0
    i++
}
```

The pseudo code implements the following rules: if the target precision uses a highest precision, then the encoder 130 rounds up the first precision and the second precision to the target precision. If the target precision uses a lowest precision, then the encoder 130 rounds down the first precision and the second precision to the target precision. Otherwise, the encoder 130 rounds up either the first precision or the second precision, whichever is lower, to the target precision, and the encoder 130 rounds down either the first precision or the second precision, whichever is higher, to the target precision. Lower means numerically lower, and higher means numerically higher. Thus, a quarter-pel precision of 0.25 is lower than an integer-pel precision of 1.0.

After rounding the precisions, the encoder 130 either rounds up or rounds down the candidate MVs based on those precisions. For instance, if a candidate MV is 1.25 and has a native precision of 0.25, and if the target precision is 0.5, then the encoder 130 rounds up the candidate MV to 1.5. A native precision is a precision of an MV before the encoder 130 rounds up or rounds down that precision per the pseudo code above. Finally, for each candidate MV, the encoder 130 determines whether an identical candidate MV or a sub-identical candidate MV is already in a candidate list. If not, then the encoder 130 adds the candidate MV to the candidate list. If so, then the encoder 130 discards the candidate MV. Sub-identical means identical within a pre-defined threshold.

In a first alternative, RoundMvPrecisionToLow( ) replaces RoundMvPrecisionToTarget( ) in the pseudo code so that the encoder 130 determines a lowest precision from among the first precision, the second precision, and the target precision, then rounds down either the first precision, the second precision, or both the first precision and the second precision to that precision. In a second alternative, RoundMvPrecisionToLow( ) replaces RoundMvPrecisionToTarget( ) in the pseudo code so that the encoder 130 determines a lowest precision from among the first precision and the second precision, then rounds down either the first precision or the second precision, whichever remains, to that precision. In a third alternative, RoundMvPrecisionToHigh( ) replaces RoundMvPrecisionToTarget( ) in the pseudo code so that the encoder 130 determines a highest precision from among the first precision, the second precision, and the target precision, then rounds up the first precision, the second precision, or both the first precision and the second precision to that precision. In a fourth alternative, RoundMvPrecisionToHigh( ) replaces RoundMvPrecisionToTarget( ) in the pseudo code so that the encoder 130 determines a highest precision from among the first precision and the second precision, then rounds up either the first precision or the second precision, whichever remains, to that precision.

In a fifth alternative, RoundMvPrecisionToDefault( ) replaces RoundMvPrecisionToTarget( ) in the pseudo code so that the encoder 130 rounds up or rounds down the first precision and the second precision to a default precision. The encoder 130 may first receive the default precision in a signal from another device. In a sixth alternative, RoundMvPrecisionToMedian( ) replaces RoundMvPrecisionToTarget( ) in the pseudo code so that the encoder 130 determines a median precision from among the first precision, the second precision, and the target precision, then rounds up or rounds down the first precision, the second precision, or both the first precision and the second precision to that precision. If the encoder 130 considers an even number of precisions, then the median precision may be an average of the two median precisions.

In a second embodiment of AMVP candidate list generation, the encoder 130 considers the target precision of the current block 210. Using the target precision, the encoder 130 executes the following pseudo code:

```
i = 0
if(availableFlagLXA) {
    mvpListLX[i++] = mvLXA
    if(availableFlagLXB && (mvLXA != mvLXB))
        mvpListLX[i++] = mvLXB
} else if(availableFlagLXB)
    mvpListLX[i++] = mvLXB
if(i < 2 && availableFlagLXCol)
    mvpListLX[i++] = mvLXCol
if(i == 2)
    if(diffMotion(mvLXM, mvLXN))
        i--
while(i < 2) {
    mvpListLX[i][0] = 0
    mvpListLX i][1] = 0
    i++
}
```

In the pseudo code, mvLXM and mvLXN in diffMotion( ) may be mvLXA, mvLXB, or mvLXCol.

The pseudo code implements the following rules for diffMotion( ) for each candidate MV, the encoder 130 determines whether an identical candidate MV or a sub-identical candidate MV is already in a candidate list. If not, then the encoder adds the candidate MV to the candidate list. If so, then the encoder 130 discards the candidate MV. Thus, the encoder 130 first considers the candidate MVs in their native precisions.

After removing identical candidate MVs or sub-identical candidate MVs, if a target precision uses a highest precision, then the encoder 130 rounds up candidate precisions to the target precision. The candidate precisions are precisions of the neighboring blocks 220-260. If a target precision uses a lowest precision, then the encoder 130 rounds down the candidate precisions to the target precision. Otherwise, the encoder 130 rounds up lower candidate precisions to the target precision, and the encoder 130 rounds down higher candidate precisions to the target precision.

After rounding the precisions, the encoder 130 either rounds up or rounds down the candidate MVs based on those precisions. For each candidate MV, the encoder 130 determines whether an identical candidate MV or a sub-identical candidate MV is already in a candidate list. If not, then the encoder 130 keeps the candidate MV in the candidate list. If so, then the encoder 130 discards the candidate MV from the candidate list. If diffMotion( ) returns 1, then two candidate MVs are not identical or sub-identical. If diffMotion( ) returns 0, then two candidate MVs are identical or sub-identical. Finally, if the candidate list is not full, then the encoder 130 inserts candidate MVs of a 0 value to fill the missing spots. For instance, if the candidate list is to have 10 MVs, but only 8 MVs are left in the candidate list, then the encoder inserts 2 MVs with a 0 value.

In a first alternative, diffMotion( ) operates so that the encoder 130 determines a lowest precision from among a first precision of a first neighboring block 220-260, a second precision of a second neighboring block 220-260, and the target precision, then rounds down all remaining candidate precisions to that precision. In a second alternative, diffMotion( )) operates so that the encoder 130 determines a highest precision from among the first precision, the second precision, and the target precision, then rounds up all remaining candidate precisions to that precision. In a third alternative, diffMotion( ) operates so that the encoder 130 rounds up or rounds down the candidate precisions to a default precision. The encoder 130 may first receive the default precision in a signal from another device. In a fourth alternative, diffMotion( ) operates so that the encoder 130 determines a median precision from among the first precision, the second precision, and the target precision, then rounds up or rounds down the first precision, the second precision, or both the first precision and the second precision to that precision. If the encoder 130 considers an even number of precisions, then the median precision may be an average of the two median precisions.

In the above embodiments, after the encoder 130 generates an AMVP candidate list, it may select a final candidate MV. The encoder 130 may do so based on various criteria that are known. Once the encoder 130 does so, the encoder 130 may signal the final candidate MV in the encoded video. Instead of comparing a first precision and a second precision, the encoder 130 may compare all candidate precisions.

Merge Candidate List Generation

In a first embodiment of merge candidate list generation, the encoder 130 considers three precisions: a first precision of a first neighboring block 220-260, a second precision of a second neighboring block 220-260, and a target precision of the current block 210. The first embodiment of merge candidate list generation is similar to the first embodiment of AMVP candidate list generation. Using the three precisions, the encoder 130 executes the following pseudo code:

```
i = 0
if(availableFlagA1)
    mergeCandList[i++] = RoundMvPrecisionToTarget(A1)
if(availableFlagB1 && diffMotions(RoundMvPrecisionToTarget(B1)))
    mergeCandList[i++] = B1
if(availableFlagB0 && diffMotions(RoundMvPrecisionToTarget(B0)))
    mergeCandList[i++] = B0
if(availableFlagA0 && diffMotions(RoundMvPrecisionToTarget(A0)))
    mergeCandList[i++] = A0
if(availableFlagB2 && diffMotions(RoundMvPrecisionToTarget(B2)))
    mergeCandList[i++] = B2
if(availableFlagCol)
    mergeCandList[i++] =
      diffMotions(RoundMvPrecisionToTarget(Col)))
```

The pseudo code implements the following rules for diffMotions( ): If the target precision uses a highest precision, then the encoder 130 rounds up the first precision and the second precision to the target precision. If the target precision uses a lowest precision, then the encoder 130 rounds down the first precision and the second precision to the target precision. Otherwise, the encoder 130 rounds up either the first precision or the second precision, whichever is lower, to the target precision, and the encoder 130 rounds down either the first precision or the second precision, whichever is higher, to the target precision.

After rounding the precisions, the encoder 130 either rounds up or rounds down the candidate MVs based on those precisions. Finally, for each candidate MV, the encoder 130 determines whether an identical candidate MV or a sub-identical candidate MV is already in a candidate list. If not, then the encoder 130 adds the candidate MV to the candidate list. If so, then the encoder 130 discards the candidate MV. If diffMotion( ) returns 1, then two candidate MVs are not identical or sub-identical. If diffMotion( ) returns 0, then two candidate MVs are identical or sub-identical.

In a first alternative, RoundMvPrecisionToLow( ) replaces RoundMvPrecisionToTarget( ) in the pseudo code so that the encoder 130 determines a lowest precision from among the first precision, the second precision, and the target precision, then rounds down either the first precision, the second precision, or both the first precision and the second precision to that precision. In a second alternative, RoundMvPrecisionToLow( ) replaces RoundMvPrecisionToTarget( ) in the pseudo code so that the encoder 130 determines a lowest precision from among the first precision and the second precision, then rounds down either the first precision or the second precision, whichever remains, to that precision. In a third alternative, RoundMvPrecisionToHigh( ) replaces RoundMvPrecisionToTarget( ) in the pseudo code so that the encoder 130 determines a highest precision from among the first precision, the second precision, and the target precision, then rounds up the first precision, the second precision, or both the first precision and the second precision to that precision. In a fourth alternative, RoundMvPrecisionToHigh( ) replaces RoundMvPrecisionToTarget( ) in the pseudo code so that the encoder 130 determines a highest precision from among the first precision and the second precision, then rounds up either the first precision or the second precision, whichever remains, to that precision.

In a fifth alternative, RoundMvPrecisionToDefault( ) replaces RoundMvPrecisionToTarget( ) in the pseudo code so that the encoder 130 rounds up or rounds down the first precision and the second precision to a default precision. The encoder 130 may first receive the default precision in a signal from another device. In a sixth alternative, RoundMvPrecisionToMedian( ) replaces RoundMvPrecisionToTarget( ) in the pseudo code so that the encoder 130 determines a median precision from among the first precision, the second precision, and the target precision, then rounds up or rounds down the first precision, the second precision, or both the first precision and the second precision to that precision. If the encoder 130 considers an even number of precisions, then the median precision may be an average of the two median precisions.

In a second embodiment of merge candidate list generation, the encoder 130 considers the target precision of the current block 210. The second embodiment of merge candidate list generation is similar to the second embodiment of AMVP candidate list generation. Using the target precision, the encoder 130 executes the following pseudo code:

```
i = 0
if(availableFlagA1)
    mergeCandList[i++] = A1
if(availableFlagB1)
    mergeCandList[i++] = B1
if(availableFlagB0)
    mergeCandList[i++] = B0
if(availableFlagA0)
    mergeCandList[i++] = A0
if(availableFlagB2)
    mergeCandList[i++] = B2
Prune List( );
if(availableFlagCol && i < max_num_candidates)
    mergeCandList[i++] = Col
```

The pseudo code implements the following rules for PruneList ( ): If a target precision uses a highest precision, then the encoder 130 rounds up candidate precisions to the target precision. The candidate precisions are precisions of the neighboring blocks 220-260. If a target precision uses a lowest precision, then the encoder 130 rounds down the candidate precisions to the target precision. Otherwise, the encoder 130 rounds up lower candidate precisions to the target precision, and the encoder 130 rounds down higher candidate precisions to the target precision.

After rounding the precisions, the encoder 130 either rounds up or rounds down the candidate MVs based on those precisions. For each candidate MV, the encoder 130 determines whether an identical candidate MV or a sub-identical candidate MV is already in a candidate list. If not, then the encoder 130 adds the candidate MV to the candidate list. If so, then the encoder 130 discards the candidate MV and decrements i by 1. Finally, if the candidate list is not full, then the encoder 130 inserts candidate MVs of a 0 value to fill the missing spots. For instance, if the candidate list is to have 10 MVs, but only 8 MVs are left in the candidate list, then the encoder 130 inserts 2 MVs with a 0 value.

In a first alternative, PruneList( ) operates so that the encoder 130 determines a lowest precision from among a first precision of a first neighboring block 220-260, a second precision of a second neighboring block 220-260, and the target precision, then rounds down all remaining candidate precisions to that precision. In a second alternative, PruneList( ) operates so that the encoder 130 determines a highest precision from among the first precision, the second precision, and the target precision, then rounds up all remaining candidate precisions to that precision. In a third alternative, PruneList( ) operates so that the encoder 130 rounds up or rounds down the candidate precisions to a default precision. The encoder 130 may first receive the default precision in a signal from another device. In a fourth alternative, PruneList( ) operates so that the encoder 130 determines a median precision from among the first precision, the second precision, and the target precision, then rounds up or rounds down the first precision, the second precision, or both the first precision and the second precision to that precision. If the encoder 130 considers an even number of precisions, then the median precision may be an average of the two median precisions.

In a third embodiment of merge candidate list generation, the encoder 130 considers the target precision of the current block 210. The third embodiment of merge candidate list generation is similar to the second embodiment of merge candidate list generation. However, unlike the second embodiment of merge candidate list generation, which executes PruneList ( ) before checking the candidate list for identical candidate MVs or sub-identical candidate MVs, the third embodiment of merge candidate list generation executes PruneList ( ) after checking a candidate list. Using the target precision, the encoder 130 executes the following pseudo code:

```
i = 0
if(availableFlagA1)
    mergeCandList[i++] = A1
if(availableFlagB1)
    mergeCandList[i++] = B1
if(availableFlagB0)
    mergeCandList[i++] = B0
if(availableFlagA0)
    mergeCandList[i++] = A0
if(availableFlagB2)
    mergeCandList[i++] = B2
if(availableFlagCol)
    mergeCandList[i++] = Col
PruneList( )
```

In the above embodiments, after the encoder 130 generates a merge candidate list, it may select a final candidate MV. The encoder 130 may do so based on various criteria that are known. Once the encoder 130 does so, the encoder 130 may signal the final candidate MV in the encoded video.

Precision Signaling

In a first embodiment of precision signaling, the encoder 130 encodes a precision for MVs in a slice header as follows:

```
slice_segment_header( ) {
    coding_mode_idx
    mv_precision[ coding_mode_idx ]
}
```

As shown, the slice header indicates a precision for all MVs for a single coding mode, which may be either AMVP or merge.

In a second embodiment of precision signaling, the encoder 130 encodes a precision for MVs in a slice header as follows:

```
slice_segment_header( ) {
    num_coding_mode
    for(i = 0; i < num_coding_mode; i++) {
        coding_mode_idx
        mv_precision_used_by_coding_mode[coding_mode_idx]
    }
}
```

As shown, the slice header indicates a precision for all MVs for multiple coding modes, which may include AMVP and merge.

In a third embodiment of precision signaling, the encoder 130 encodes a precision for MVs in a slice header as follows:

```
slice_segment_header( ) {
    if( motion_vector_resolution_control_idc = = 3 ) {
        num_mv_precision
        for( i = 0; i < num_mv_precision; i++ ) {
            mv_precision_idx[i]
        }
    }
}
```

As shown, the slice header indicates a precision for all MVs for multiple coding modes, which may include AMVP and merge. The third embodiment of signaling is similar to the second embodiment of signaling, but uses a different syntax.

In a fourth embodiment of precision signaling, the encoder 130 encodes a precision for MVs in a coding unit header as follows:

```
coding_unit( x0, y0, log2CbSize ) {
    if( motion_vector_resolution_control_idc = = 3 ) {
        mv_precision_idx_used_by_coding_mode
    }
}
```

As shown, the coding unit header indicates a precision for all MVs for a single coding mode, which may be either AMVP or merge.

In a fifth embodiment of precision signaling, the encoder 130 encodes a precision for MVs in a coding unit header as follows:

```
coding_unit( x0, y0, log2CbSize ) {
    if(motion_vector_resolution_control_idc = = 3) {
        num_coding_mode
        for(i = 0; i < num_coding_mode; i++) {
            coding_mode_idx
            mv_precision_idx_used_by_coding_mode[coding_mode_idx]
        }
    }
}
```

As shown, the coding unit header indicates a precision for all MVs for multiple coding modes, which may include AMVP and merge.

In a sixth embodiment of precision signaling, the encoder 130 encodes all allowed precisions in an SPS in a form such as {mvr1, mvr2, . . . , mvrN}. For each slice header, the encoder 130 also encodes a slice header index indicating one of those precisions that is to apply to all blocks in the corresponding slice. For instance, the SPS is {quarter-pel, integer-pel, four-pel} and a slice header index is either 00 indicating quarter-pel, 01 indicating integer-pel, or 11 indicating four-pel.

In a seventh embodiment of precision signaling, the encoder 130 encodes all allowed precisions in an SPS in a form such as {mvr1, mvr2, . . . , mvrN}. For each slice header, the encoder 130 also encodes multiple slice header indices indicating which of those precisions are to apply to blocks in the corresponding slice. For instance, the SPS is {quarter-pel, integer-pel, four-pel} and the slice header indices are any combination of 00 indicating quarter-pel, 01 indicating integer-pel, and 11 indicating four-pel.

In an eighth embodiment of precision signaling, the encoder 130 encodes all allowed precisions in an SPS in a form such as {mvr1, mvr2, . . . , mvrN}. For each slice header, the encoder 130 also encodes a slice header index indicating a subset of those precisions that are to apply to blocks in the corresponding slice. For instance, the SPS is {quarter-pel, integer-pel, four-pel} and the slice header index is 00 indicating {quarter-pel, integer-pel}, 01 indicating {quarter-pel, four-pel}, or 10 indicating {integer-pel, four-pel}.

In a ninth embodiment of precision signaling, the encoder 130 encodes all allowed precisions in an SPS in a form such as {mvr1, mvr2, . . . , mvrN}. For each slice header, the encoder 130 also encodes a slice header index indicating one of those precisions, in addition to its immediate finer or coarser precision, that are to apply to blocks in the corresponding slice. For instance, the SPS is {quarter-pel, integer-pel, four-pel}, and the slice header index is 00 indicating {quarter-pel}, 01 indicating {quarter-pel, integer-pel}, or 10 indicating {integer-pel, four-pel} when the slice header indicates a finer precision or the slice header index is 00 indicating {quarter-pel, integer-pel}, 01 indicating {integer-pel, four-pel}, or 10 indicating {four-pel} when the slice header indicates a coarser precision.

In a tenth embodiment of precision signaling, the encoder 130 encodes all allowed precisions in an SPS in a form such as {mvr1, mvr2, . . . , mvrN}. For each slice header, the encoder 130 also encodes a slice header index indicating which of those precisions are to apply to blocks in the corresponding slice. For each block header, the encoder 130 also encodes a block header index indicating one of those precisions that is to apply to the corresponding block. For instance, the SPS is {quarter-pel, integer-pel, four-pel}, a first slice header index of 0 indicates {quarter-pel, integer-pel}, a first block header index of 0 in the first slice header indicates quarter-pel, a second block header index of 1 in the first slice header indicates integer-pel, a second slice header index of 1 indicates {integer-pel, four-pel}, a third block header index of 0 in the second slice header indicates integer-pel, and a fourth block header index of 1 in the second slice header indicates four-pel.

In the above embodiments, instead of encoding header indices at the slice level, the encoder 130 may encode the header indices at the region level, CTU level, or tile level. Though the indices are expressed as specific binary numbers, any binary numbers or other numbers may be used. Instead of indicating all precisions in an SPS, the encoder 130 may indicate all the precisions in a PPS. Instead of comparing a first precision and a second precision, the encoder 130 may compare all candidate precisions.

Figure 3:
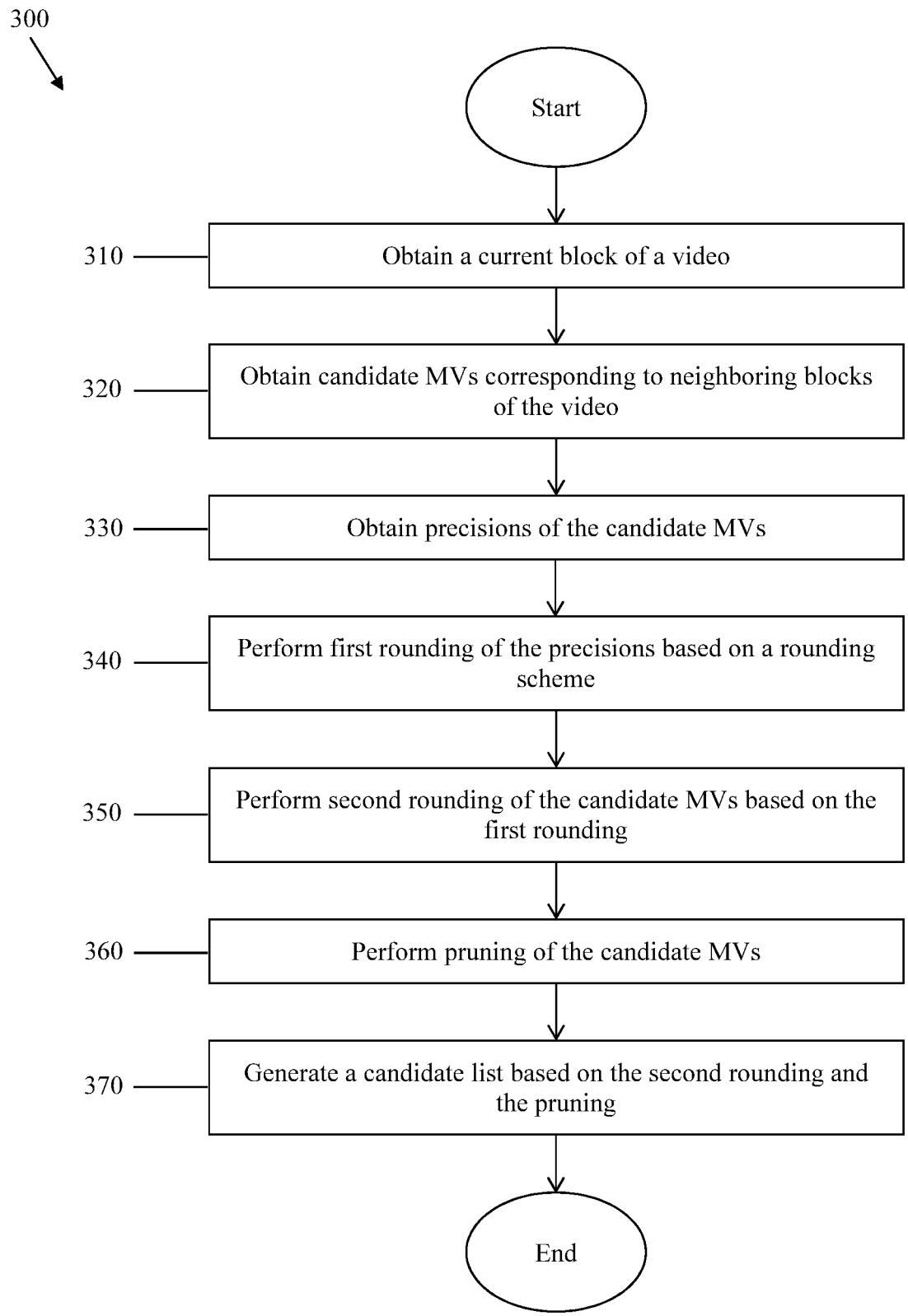
FIG. 3 is a flowchart illustrating a method of candidate list generation according to an embodiment of the disclosure.

FIG. 3 is a flowchart illustrating a method 300 of candidate list generation according to an embodiment of the disclosure. The encoder 130 performs the method 300. At step 310, a current block of a video is obtained. For instance, the encoder 130 obtains the current block 210. At step 320, candidate MVs corresponding to neighboring blocks of the video are obtained. The neighboring blocks neighbor the current block. For instance, the encoder 130 obtains candidate MVs corresponding to the neighboring blocks 220-260. At step 330, precisions of the candidate MVs are obtained.

At step 340, first rounding of the precisions is performed based on a rounding scheme. For instance, the rounding scheme is one of the rounding schemes described above. Thus, the rounding scheme may comprise rounding to a target precision; rounding to a lowest precision, a median precision, or a highest precision from among precisions of the neighboring blocks 220-260; rounding to a lowest precision, a median precision, or a highest precision from among precisions of the neighboring blocks 220-260 and the target block; or rounding to a default precision. At step 350, second rounding of the candidate MVs is performed based on the first rounding. For instance, the encoder 130 determines a precision from step 340 and either rounds up or rounds down the candidate MVs based on that precision.

At step 360, pruning of the candidate MVs is performed. For instance, the pruning is completed as described above. Thus, the pruning may comprise discarding identical candidate MVs, discarding sub-identical candidate MVs, or adding zero MVs to fill a candidate list. Finally, at step 370, a candidate list is generated based on the second rounding and the pruning. The candidate list may be an AMVP candidate list or a merge candidate list as described above.

Figure 4:
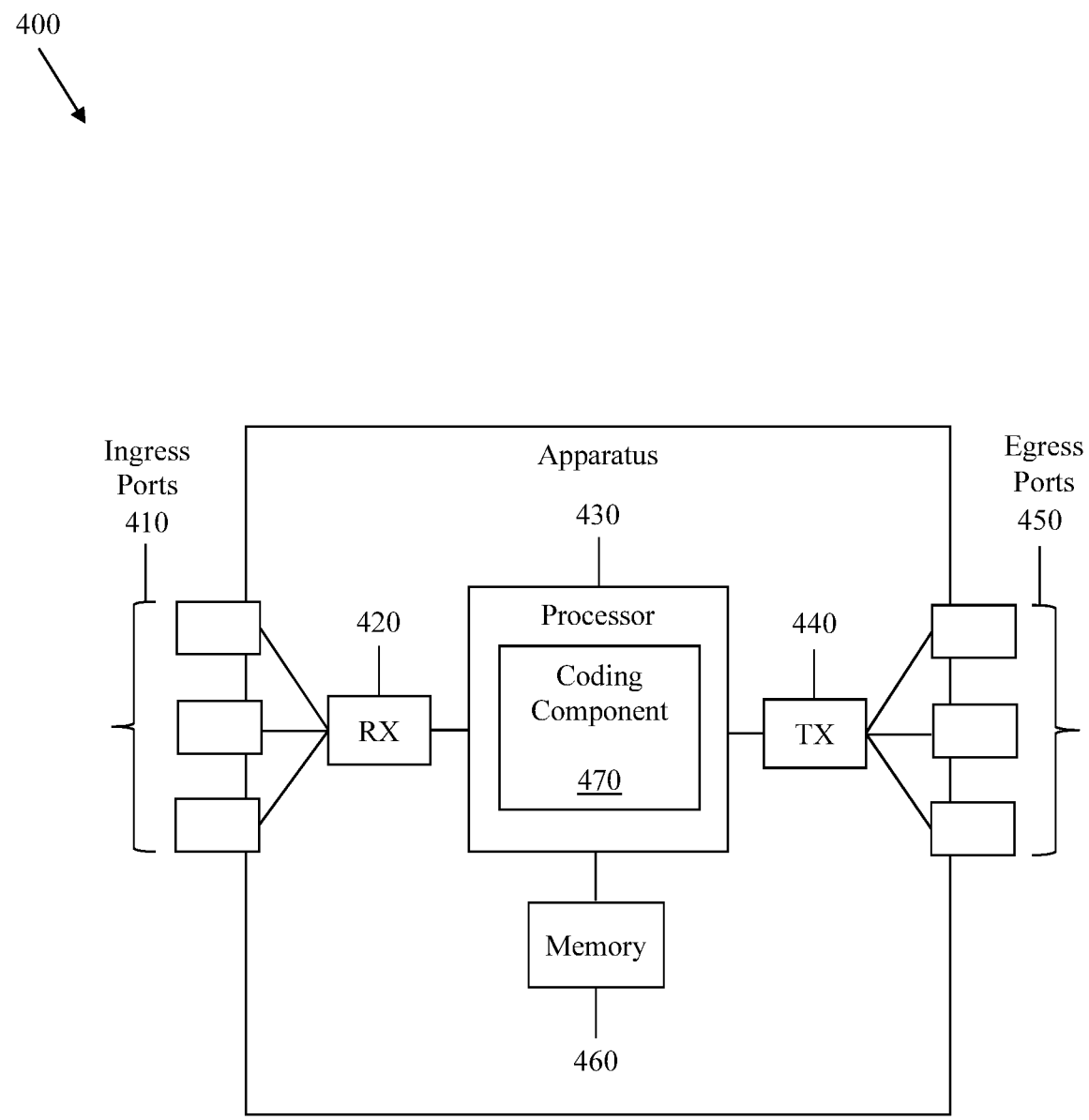
FIG. 4 is a schematic diagram of an apparatus according to an embodiment of the disclosure.

FIG. 4 is a schematic diagram of an apparatus 400 according to an embodiment of the disclosure. The apparatus 400 may implement the disclosed embodiments. The apparatus 400 comprises ingress ports 410 and an RX 420 for receiving data; a processor, logic unit, baseband unit, or CPU 430 to process the data; a TX 440 and egress ports 450 for transmitting the data; and a memory 460 for storing the data. The apparatus 400 may also comprise OE components, EO components, or RF components coupled to the ingress ports 410, the RX 420, the TX 440, and the egress ports 450 for ingress or egress of optical, electrical signals, or RF signals.

The processor 430 is any combination of hardware, middleware, firmware, or software. The processor 430 comprises any combination of one or more CPU chips, cores, FPGAs, ASICs, or DSPs. The processor 430 communicates with the ingress ports 410, the RX 420, the TX 440, the egress ports 450, and the memory 460. The processor 430 comprises a coding component 470, which implements the disclosed embodiments. The inclusion of the coding component 470 therefore provides a substantial improvement to the functionality of the apparatus 400 and effects a transformation of the apparatus 400 to a different state. Alternatively, the memory 460 stores the coding component 470 as instructions, and the processor 430 executes those instructions.

The memory 460 comprises any combination of disks, tape drives, or solid-state drives. The apparatus 400 may use the memory 460 as an over-flow data storage device to store programs when the apparatus 400 selects those programs for execution and to store instructions and data that the apparatus 400 reads during execution of those programs. The memory 460 may be volatile or non-volatile and may be any combination of ROM, RAM, TCAM, or SRAM.

In an example embodiment, an apparatus comprises: a memory element; and a processor element coupled to the memory element and configured to: obtain a current block of a video frame, obtain candidate MVs corresponding to neighboring blocks of the video frame, the neighboring blocks neighbor the current block, obtain precisions of the candidate MVs, perform first rounding of the precisions based on a rounding scheme, perform second rounding of the candidate MVs based on the first rounding, perform pruning of the candidate MVs, and generate a candidate list based on the second rounding and the pruning.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented by a coding device and comprising:
    obtaining a current block of a video frame;
    obtaining candidate motion vectors (MVs) corresponding to neighboring blocks of the current block, wherein the neighboring blocks neighbor the current block;
    obtaining precisions of the candidate MVs;
    performing first rounding of the precisions based on a rounding scheme, wherein the rounding scheme comprises rounding the precisions to a target precision of the current block;
    performing second rounding of the candidate MVs based on the first rounding;
    performing pruning of the candidate MVs; and
    generating a candidate list based on the second rounding and the pruning.

2. The method of claim 1, wherein the neighboring blocks comprise a first neighboring block and a second neighboring block, and wherein the precisions comprise a first precision of the first neighboring block and a second precision of the second neighboring block.

3. The method of claim 2, wherein the rounding scheme comprises rounding the first precision to the target precision.

4. The method of claim 3, wherein the rounding scheme further comprises rounding the second precision to the target precision.

5. The method of claim 1, further comprising selecting a final candidate MV from the candidate list.

6. The method of claim 5, further comprising signaling the final candidate MV in an encoded video.

7. The method of claim 6, further comprising transmitting the encoded video.

8. The method of claim 1, wherein the pruning comprises discarding identical candidate MVs.

9. The method of claim 1, wherein the pruning comprises discarding sub-identical candidate MVs.

10. The method of claim 1, wherein the pruning comprises adding zero MVs to fill the candidate list.

11. An apparatus comprising:
    a memory; and
    a processor coupled to the memory and configured to:
        obtain a current block of a video frame;
        obtain candidate motion vectors (MVs) corresponding to neighboring blocks of the current block, wherein the neighboring blocks neighbor the current block;
        obtain precisions of the candidate MVs;
        perform first rounding of the precisions based on a rounding scheme, wherein the rounding scheme comprises rounding the precisions to a target precision of the current block;
        perform second rounding of the candidate MVs based on the first rounding;
        perform pruning of the candidate MVs; and
        generate a candidate list based on the second rounding and the pruning.

12. The apparatus of claim 11, wherein the neighboring blocks comprise a first neighboring block and a second neighboring block, and wherein the precisions comprise a first precision of the first neighboring block and a second precision of the second neighboring block.

13. The apparatus of claim 12, wherein the rounding scheme comprises rounding the first precision to the target precision.

14. The apparatus of claim 13, wherein the rounding scheme further comprises rounding the second precision to the target precision.

15. The apparatus of claim 11, wherein the processor is further configured to select a final candidate MV from the candidate list.

16. The apparatus of claim 15, wherein the processor is further configured to signal the final candidate MV in an encoded video.

17. The apparatus of claim 16, wherein the processor is further configured to transmit the encoded video.

18. The apparatus of claim 11, wherein the pruning comprises discarding identical candidate MVs.

19. The apparatus of claim 11, wherein the pruning comprises discarding sub-identical candidate MVs.

20. The apparatus of claim 11, wherein the pruning comprises adding zero MVs to fill the candidate list.

21. A computer program product comprising instructions that are stored on a non-transitory computer-readable medium and that, when executed by a processor, cause an apparatus to:
    obtain a current block of a video frame;
    obtain candidate motion vectors (MVs) corresponding to neighboring blocks of the current block, wherein the neighboring blocks neighbor the current block;
    obtain precisions of the candidate MVs;
    perform first rounding of the precisions based on a rounding scheme, wherein the rounding scheme comprises rounding the precisions to a target precision of the current block;
    perform second rounding of the candidate MVs based on the first rounding;
    perform pruning of the candidate MVs; and generate a candidate list based on the second rounding and the pruning.

22. The computer program product of claim 21, wherein the neighboring blocks comprise a first neighboring block and a second neighboring block, wherein the precisions comprise a first precision of the first neighboring block and a second precision of the second neighboring block, and wherein the rounding scheme comprises:
   rounding the first precision to the target precision; and
   rounding the second precision to the target precision.

23. The computer program product of claim 21, wherein the instructions further cause the apparatus to:
   select a final candidate MV from the candidate list;
   signal the final candidate MV in an encoded video; and
   transmit the encoded video.

24. The computer program product of claim 21, wherein the pruning comprises discarding identical candidate MVs, discarding sub-identical candidate MVs, or adding zero MVs to fill the candidate list.

* * * * *